United States Patent
Yu et al.

(10) Patent No.: US 10,903,877 B2
(45) Date of Patent: *Jan. 26, 2021

(54) INITIAL ACCESS PROCEDURE FOR MULTI-BEAM OPERATION

(71) Applicant: MEDIATEK INC., Hsinchu (TW)

(72) Inventors: Chia-Hao Yu, Hsinchu (TW); Yuanyuan Zhang, Beijing (CN); Ming-Po Chang, Hsinchu (TW); Guo Hau Gau, Hsinchu (TW); Jiann-Ching Guey, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/802,681

(22) Filed: Nov. 3, 2017

(65) Prior Publication Data

US 2018/0123650 A1 May 3, 2018

Related U.S. Application Data

(60) Provisional application No. 62/416,737, filed on Nov. 3, 2016.

(51) Int. Cl.
*H04B 7/0408* (2017.01)
*H01Q 25/04* (2006.01)
(Continued)

(52) U.S. Cl.
CPC ......... *H04B 7/0408* (2013.01); *H01Q 25/002* (2013.01); *H01Q 25/04* (2013.01);
(Continued)

(58) Field of Classification Search
CPC .... H01Q 25/002; H01Q 25/04; H04B 7/0408; H04B 7/0695; H04B 7/088
See application file for complete search history.

(56) References Cited

U.S. PATENT DOCUMENTS

| 2013/0170428 A1* | 7/2013 | Morioka | H04B 7/155 370/315 |
| 2013/0223251 A1 | 8/2013 | Li et al. | 370/252 |

(Continued)

FOREIGN PATENT DOCUMENTS

| CN | 105830496 A | 9/2014 |
| WO | WO2016086144 A1 | 11/2014 |

(Continued)

OTHER PUBLICATIONS

Taiwan IPO, search report for the TW patent application 106138352 (no English translation is available) dated Jan. 16, 2018 (8 pages).

*Primary Examiner* — Yemane Mesfin
*Assistant Examiner* — Henry Baron
(74) *Attorney, Agent, or Firm* — Imperium Patent Works; Helen Mao

(57) ABSTRACT

Apparatus and methods are provided for initial access in the multi-beam operation. In one novel aspect, the UE receives multiple response messages and selects one message as the response message. In one embodiment, the UE selects a subset of a configured UL resources, transmits a first message, wherein the first message is transmitted one or more times on each of the selected set of UL resources, receives one or more first-message-response messages from the BS, and selects one response message, wherein the selected response message indicates a corresponding BS RX resource, which is used by the UE for subsequent communication with the BS. In one embodiment, the selection of UL resources is at least based on transmitting spatial characteristics of the BS, the UE or both, which indicates whether the BS/UE is reciprocal, partial reciprocal or non-reciprocal.

39 Claims, 13 Drawing Sheets

(51) Int. Cl.
*H01Q 25/00* (2006.01)
*H04B 7/08* (2006.01)
*H04B 7/06* (2006.01)
H04W 74/00 (2009.01)
H04W 74/08 (2009.01)

(52) U.S. Cl.
CPC .......... *H04B 7/0695* (2013.01); *H04B 7/088* (2013.01); *H04W 74/006* (2013.01); *H04W 74/0833* (2013.01)

(56) References Cited

U.S. PATENT DOCUMENTS

| | | | |
|---|---|---|---|
| 2013/0242951 A1* | 9/2013 | Lee | H04W 56/001 370/336 |
| 2014/0323143 A1* | 10/2014 | Jung | H04B 7/0617 455/452.1 |
| 2014/0376466 A1 | 12/2014 | Jeong et al. | 370/329 |
| 2016/0087704 A1 | 3/2016 | Guey et al. | 370/336 |
| 2016/0157267 A1 | 6/2016 | Frenne et al. | 370/329 |
| 2017/0251460 A1* | 8/2017 | Agiwal | H04W 72/0406 |

FOREIGN PATENT DOCUMENTS

| | | |
|---|---|---|
| WO | WO2016116065 A1 | 1/2015 |
| WO | WO2016120761 A1 | 1/2015 |

\* cited by examiner

INITIAL ACCESS PROCEDURE FOR MULTI-BEAM OPERATION

CROSS REFERENCE TO RELATED APPLICATIONS

This application claims priority under 35 U.S.C. § 119 from U.S. Provisional Application No. 62/416,737 entitled "INITIAL ACCESS PROCEDURE FOR MULTI-BEAM OPERATION" filed on Nov. 3, 2016, the subject matter of which is incorporated herein by reference.

TECHNICAL FIELD

The disclosed embodiments relate generally to wireless communication, and, more particularly, to initial access procedure for multi-beam operation.

BACKGROUND

The bandwidth shortage increasingly experienced by mobile carriers has motivated the exploration of underutilized frequency spectrum such as millimeter wave (mmWave) between 3G and 300G Hz for the next generation broadband cellular communication networks. The available spectrum of mmWave band is two hundred times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions.

Technologies such as mmWave network requires multi-beam operation. The network depends extensively on adaptive beamforming at a scale that far exceeds current cellular system. The base station has multiple directional beams or spatial characteristics. Each beamforming may have its own control beam. The periodic and pre-determined provision of a set of coarse control beams provides moderate beamforming gain. Each beam broadcasts a minimum amount of beam-specific information similar to system information block (SIB) or master information block (MIB) in the long term evolve (LTE) network. Multiple control information are transmitted and received in the multi-beam network.

Improvements and enhancements are required for initial access in the multi-beam operation.

SUMMARY

Apparatus and methods are provided for initial access in the multi-beam operation. In one novel aspect, the UE receives multiple response messages and selects one message as the response message. In one embodiment, the UE selects a subset of a configured UL resources, transmits a first message, wherein the first message is transmitted one or more times on each of the selected set of UL resources, receives one or more first-message-response messages from the BS, and selects one response message, wherein the selected response message indicates a corresponding BS receiving (RX) resource, which is used by the UE for subsequent communication with the BS. In one embodiment, the selection of UL resources is at least based on a BS transmitting spatial characteristics, which indicates whether the BS is reciprocal, partial reciprocal or non-reciprocal. In one embodiment, the transmitting of the first message is at least based on a UE transmitting spatial characteristics, which indicates whether the UE is reciprocal, partial reciprocal or non-reciprocal. In another embodiment, the UL resources are configured in multiple sets, and wherein each set of the UL resource corresponds to a BS TX characteristic. A BS TX characteristic can be a spatial characteristic. A BS TX characteristic can correspond to a DL channel or DL control beam configured.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
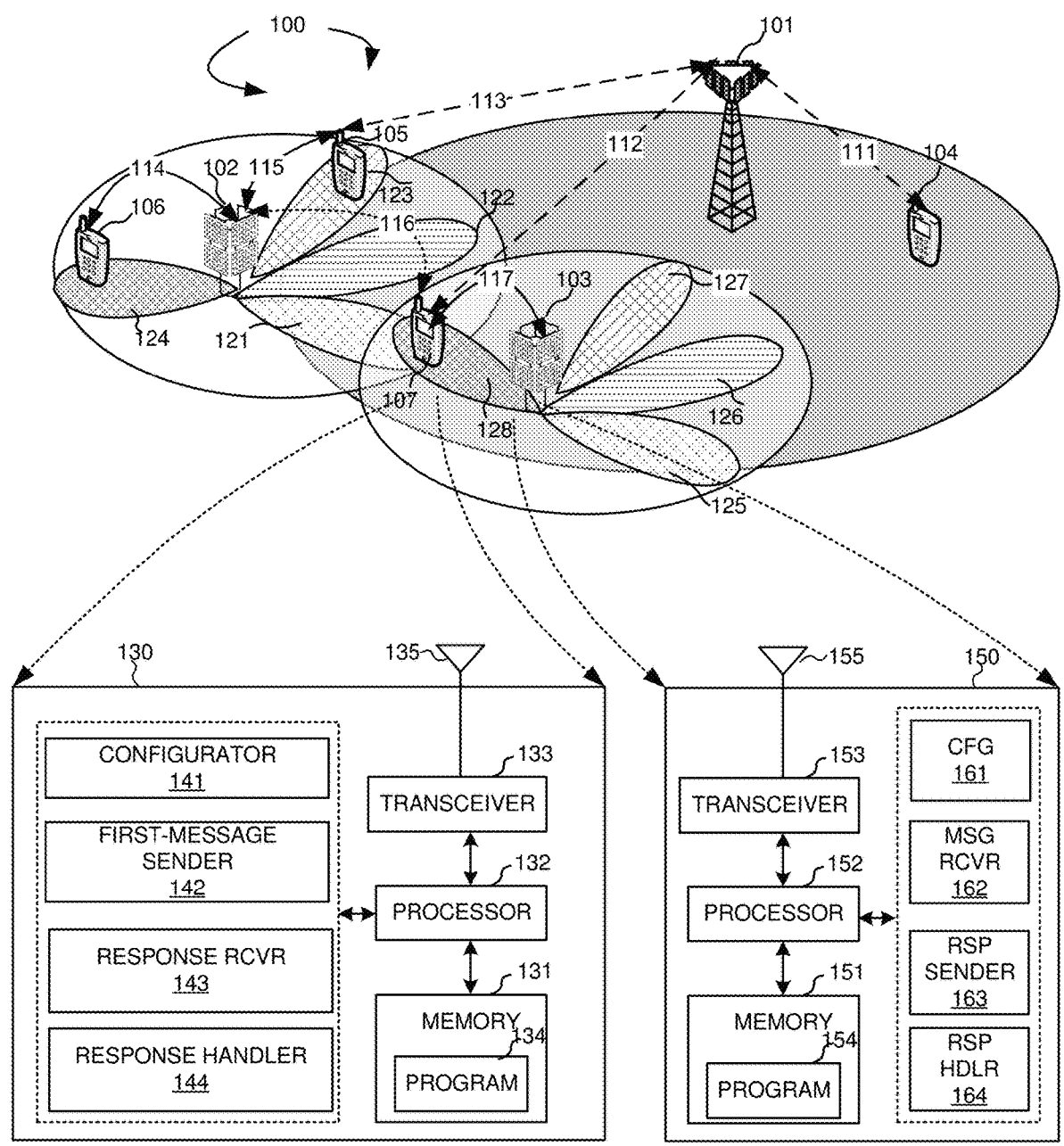
FIG. 1 is a schematic system diagram illustrating an exemplary wireless network with multi-beam, such as mmWave connections in accordance with embodiments of the current invention.

FIG. 1 is a schematic system diagram illustrating an exemplary wireless network 100 with multi-beam, such as mmWave connections in accordance with embodiments of the current invention. Wireless system 100 includes one or more fixed base infrastructure units forming a network distributed over a geographical region. The base unit may also be referred to as an access point, an access terminal, a base station, a Node-B, an eNode-B, or by other terminology used in the art. As an example, base stations 101, 102 and 103 serve several mobile stations 104, 105, 106 and 107 within a serving area, for example, a cell, or within a cell sector. In some systems, one or more base stations are coupled to a controller forming an access network that is coupled to one or more core networks. eNB 101 is a conventional base station served as a macro eNB. eNB 102 and eNB 103 are multi-beam base station, the serving area of which may overlap with serving area of eNB 101, as well as may overlap with each other at the edge. If the serving area of multi-beam eNB does not overlap the serving area of macro eNB, the multi-beam eNB is considered as stand-alone, which can also provide service to users without the assistance of macro eNB. multi-beam eNB 102 and multi-beam eNB 103 has multiple sectors each with multiple control beams to cover a directional area. Control beams 121, 122, 123 and 124 are exemplary control beams of eNB 102. Control beams 125, 126, 127 and 128 are exemplary control beams of eNB 103. As an example, UE or mobile station 104 is only in the service area of eNB 101 and connected with eNB 101 via a link 111. UE 106 is connected with multi-beam network only, which is covered by control beam 124 of eNB 102 and is connected with eNB 102 via a link 114. UE 105 is in the overlapping service area of eNB 101 and eNB 102. In one embodiment, UE 105 is configured with dual connectivity and can be connected with eNB 101 via a link 113 and eNB 102 via a link 115 simultaneously. UE 107 is in the service areas of eNB 101, eNB 102, and eNB 103. In embodiment, UE 107 is configured with dual connectivity and can be connected with eNB 101 with a link 112 and eNB 103 with a link 117. In embodiment, UE 107 can switch to a link 116 connecting to eNB 102 upon connection failure with eNB 103.

FIG. 1 further illustrates simplified block diagrams 130 and 150 for UE 107 and eNB 103, respectively. Mobile station 107 has an antenna 135, which transmits and receives radio signals. A RF transceiver module 133, coupled with the antenna, receives RF signals from antenna 135, converts them to baseband signal, and sends them to processor 132. RF transceiver module 133 is an example, and in one embodiment, the RF transceiver module comprises two RF modules (not shown), first RF module is used for multi-beam transmitting and receiving, and another RF module is used for different frequency bands transmitting and receiving which is different from the multi-beam transmitting and receiving. RF transceiver 133 also converts received baseband signals from processor 132, converts them to RF signals, and sends out to antenna 135. Processor 132 processes the received baseband signals and invokes different functional modules to perform features in mobile station 107. Memory 131 stores program instructions and data 134 to control the operations of mobile station 107.

Mobile station 107 also includes multiple function modules that carry out different tasks in accordance with embodiments of the current invention. A configurator 141 selects a subset of a configured UL resources, wherein the UL resources is configured by a BS downlink (DL) broadcast message. A first-message sender 142 transmits a first message to the BS, wherein the first message is transmitted one or more times on each of the selected set of UL resources. A response receiver 143 receives one or more first-message-response messages from the BS in response to the first message from the BS. A response handler 144 selects one response message from the received one or more first-message-response messages, wherein the selected response message indicates a corresponding BS receiving (RX) resource, which is used by the UE for subsequent communication with the BS Similarly, eNB 103 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 103. Memory 151 stores program instructions and data 154 to control the operations of eNB 103. eNB 103 also includes multiple function modules that carry out different tasks in accordance with embodiments of the current invention. A configurator 161 configures uplink resources. A message receiver 162 receives one or more first messages and selects one. A response message sender 163 sends one or more response messages in response to the reception of the first message. A response handler 164 builds one or more response messages to be sent.

Figure 2:
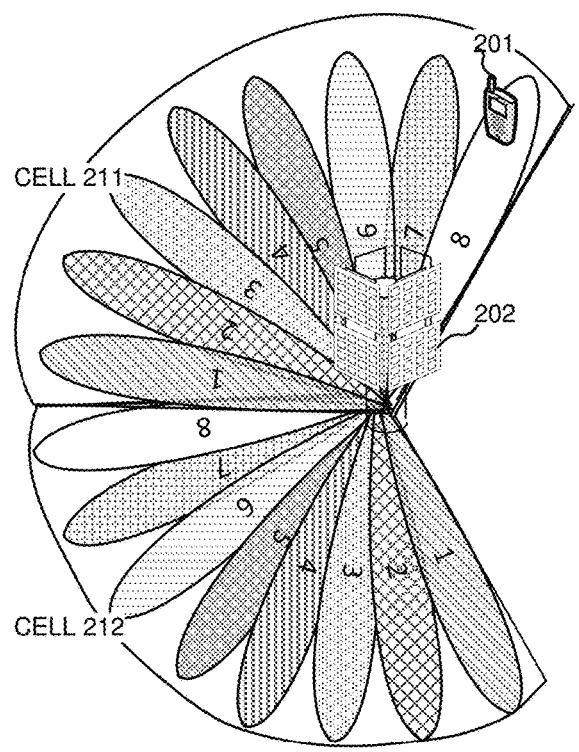
FIG. 2 illustrates an exemplary mmWave wireless system with multiple control beams in multiple directionally configured cells.

FIG. 2 illustrates an exemplary multi-beam wireless system with multiple control beams in multiple directionally configured cells. A UE 201 is connected with an multi-beam eNB 202. multi-beam eNB 202 is directionally configured with multiple sectors/cells. Each sector/cell is covered by a set of coarse TX control beams. As an example, cells 211 and 212 are configured cells for multi-beam eNB 202. In one example, three sectors/cells are configured, each covering a 120° sector. In one embodiment, each cell is covered by eight control beams. Different control beams are time division multiplexed (TDM) and distinguishable. Phased array antenna is used to provide a moderate beamforming gain. The set of control beams is transmitted repeatedly and periodically. Besides coarse TX control beams, there are multiple dedicated beams (not illustrated), which are finer-resolution BS beams. Each control beam broadcasts the cell-specific information such as synchronization signal, system information, and beam-specific information. The UE has access to the information broadcasted by the control beam transmission.

Figure 3:
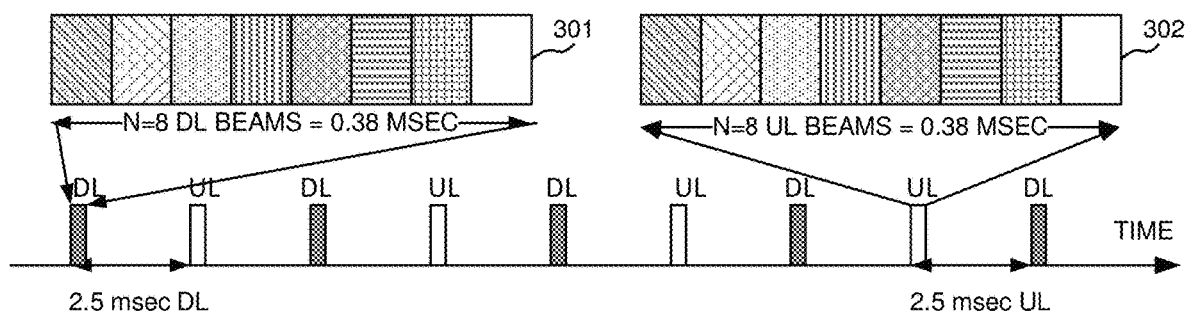
FIG. 3 illustrates an exemplary control beam configuration for UL and DL of the UE in accordance with the current invention.

FIG. 3 illustrates an exemplary control beam configuration for UL and DL of the UE in accordance with the current invention. A control beam is a combination of downlink and uplink resources. The linking between the DL resource and the UL resources of a control beam is indicated explicitly in the system information or beam-specific information. It can also be derived implicitly based on some rules, such as the interval between DL and UL transmission opportunities. In one embodiment, A DL frame 301 has eight DL beams occupying a total of 0.38 msec. A UL frame 302 has eight UL beams occupying a total of 0.38 msec. The interval between the UL frame and the DL frame is 2.5 msec. In one embodiment, the DL and UL has symmetric control beams.

Figure 4:
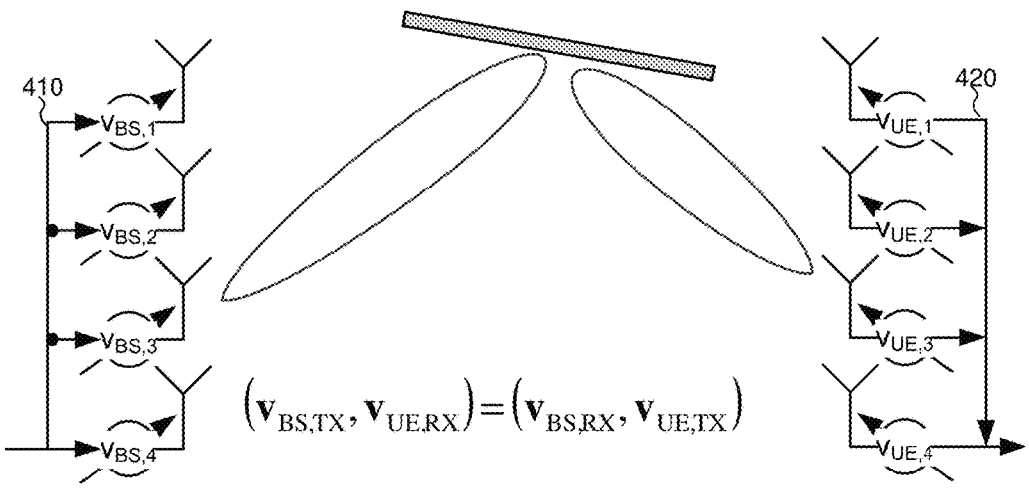
FIG. 4 illustrates an exemplary diagram of beam reciprocity, which is an important factor in accordance with embodiments of the current invention.

FIG. 4 illustrates an exemplary diagram of beam reciprocity, which is an important factor in accordance with embodiments of the current invention. Diffraction affects the reciprocal lattice. In multi-beam conditions, diffraction occurs for all the reciprocal lattice points. The reciprocity of TX and RX beam needs to be calibrated. In real operation, the TX and RX beam may not be reciprocal. 410 is a receiver lattice and 420 is a transmitter lattice. A TX/RX beam reciprocity at BS holds if BS is able to determine a BS RX beam for the UL reception based on UE's DL measurement on BS's one or more TX beams, and BS is able to determine a BS TX beam for the DL transmission based on BS's UL measurement on BS's one or more RX beams. Similarly, a TX/RX beam reciprocity at UE holds if UE is able to determine a UE RX beam for the DL reception based on BS's UL measurement on UE's one or more TX beams, and UE is able to determine a UE TX beam for the UL transmission based on UE's DL measurement on UE's one or more RX beams. A calibration can give the device the TX/RX beam reciprocity. A BS with TX/RX beam reciprocity is called a reciprocal BS. A UE with TX/RX beam reciprocity is called a reciprocal UE. In one embodiment, each UE obtains its own character of reciprocity. In another embodiment, the BS does not know a UE's reciprocity until after the initial access. In one embodiment, the UE reciprocity is obtained through capability signalling for BS. In yet another embodiment, the UE obtains the BS's reciprocity through system information.

To access a wireless network, the UE performs an initial access procedure. The UE acquires essential information, such as information in MIB and SIB, in a broadcast channel. One of the essential information to be carried in the DL broadcast channel is random access channel (RACH) resources for RACH msg-1 transmission, with which both ends learn how to communicate with each other via dedicated channels. In the multi-beam operation, such as with multiple control beams, the association of information from the DL broadcast channel transmitted by a control beam to RACH resources needs to be acquired. In the multi-beam operation, each individual control beam may carry its own broadcast channel. Different assumptions on beam reciprocity lead to different association of a DL channel/signaling carried by a control beam and RACH resources varies. Essentially, during the initial access, beam pairs used for DL/UL communication are learned by both ends if such information is needed for enabling communication. The association should provide proper RACH resources to enable beam acquisition at either DL, UL, or both.

Figure 5:
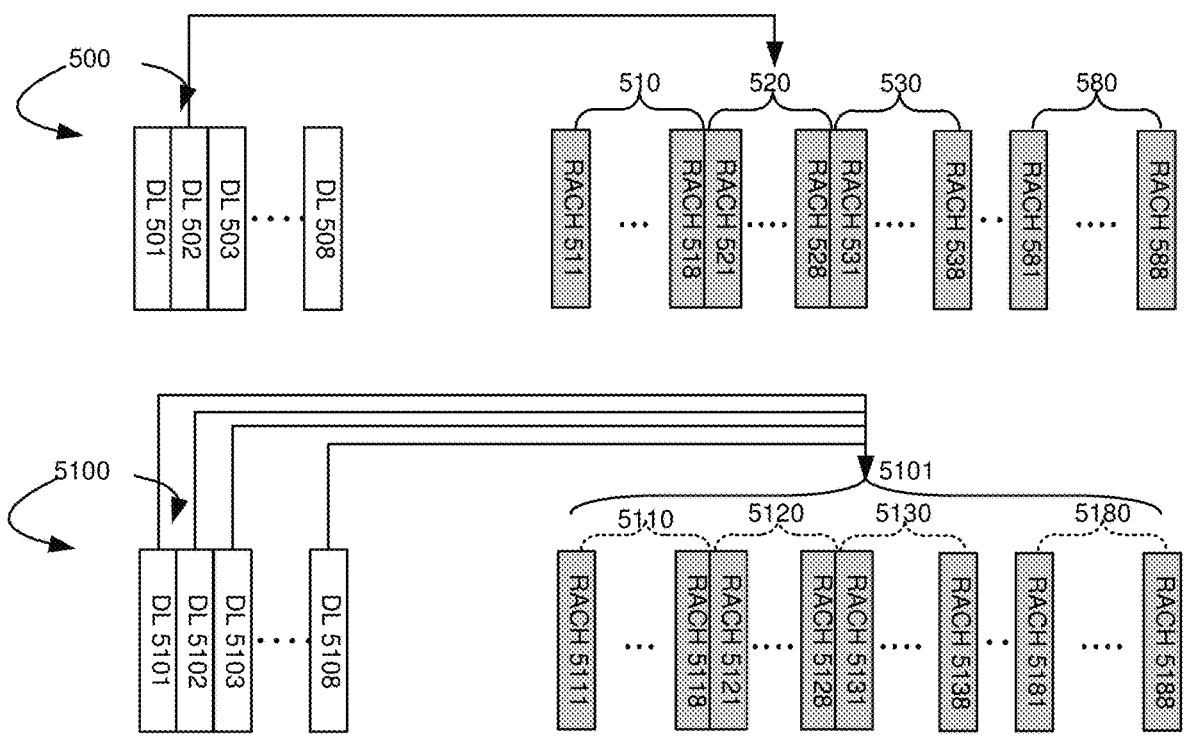
FIG. 5 illustrates exemplary diagram for RACH resource association of reciprocal and non-reciprocal base stations in accordance to embodiments of the current invention.

FIG. 5 illustrates exemplary diagram for RACH resource association of reciprocal and non-reciprocal base stations in accordance to embodiments of the current invention. During initial access, the BS assumes no knowledge on UE reciprocity. The UE reciprocity is known after UE connects with the network. In one embodiment, the BS obtains UE's reciprocity through capability signaling. The association configuration is simply based on BS reciprocity. The RACH resources are grouped based on BS characters. In one embodiment, the RACH resources are grouped based on the BS receiving behavior. A configuration 500 illustrates a reciprocal BS configuration for RACH resources. The reciprocal BS has multiple DL channels, 501, 502, 503, and 508. Each of the DL channels corresponds to one set of RACH resources. Each RACH resource indicates a resource pool. DL 501 points to RACH resource group 510 including multiple RACH resources such as 511 and 518. Similarly, DL 502 points to RACH resource group 520 including multiple RACH resources such as 521 and 528. DL 503 points to RACH resource group 530 including multiple RACH resources such as 531 and 538. DL 508 points to RACH resource group 580 including multiple RACH resources such as 581 and 588.

If the BS is non-reciprocal, each DL channels points to the entire RACH resources. A configuration 5100 illustrates a non-reciprocal BS configuration for RACH resources. The non-reciprocal BS has multiple DL channels, 5101, 5102, 5103, and 5108. The RACH resources are configured in multiple groups. RACH group 5110 includes multiple RACH resources such as 5111 and 5118. RACH group 5120 includes multiple RACH resources such as 5121 and 5128. RACH group 5130 includes multiple RACH resources such as 5131 and 5138. RACH group 5180 includes multiple RACH resources such as 5181 and 5188. Each of the DL channels corresponds to entire RACH resources 5101, which include RACH groups 5110, 5120, 5130, and 5180.

Figure 6:
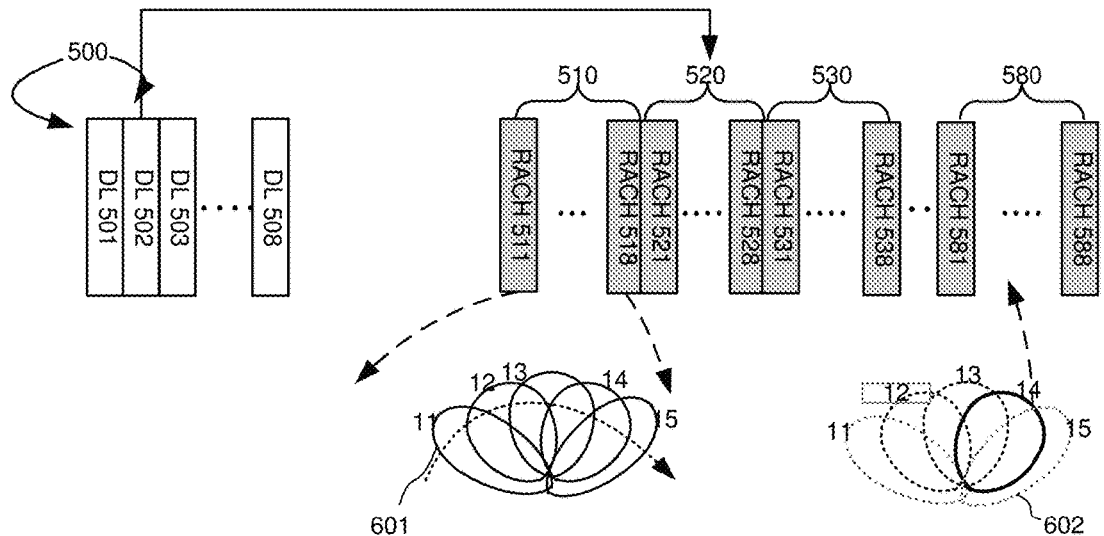
FIG. 6 illustrates exemplary diagrams of RACH resource association with reciprocal and non-reciprocal UEs in accordance with embodiments of the current invention.

FIG. 6 illustrates exemplary diagrams of RACH resource association with reciprocal and non-reciprocal UEs in accordance with embodiments of the current invention. The UE can learn the reciprocity capability of the BS explicitly through signaling such as the system information, or implicitly by learning from association configurations. The reciprocal UE can selectively use only part of the provided RACH resources. It saves the UE power and reduces message, such as Msg-1 collision probability. Further, using only part of the RACH resources allows the reduction of the size of the total RACH resource pool. The reciprocal BS configuration 500 is used. A non-reciprocal UE 601 with multi-beam 11, 12, 13, 14, and 15 sends the first message, such as Msg-1 using beam sweeping. Msg-1 is sent on beams 11, 12, 13, 14 and 15. A reciprocal UE 602 with multi-beam 11, 12, 13, 14, and 15 sends the first message, such as Msg-1 using one beam 14. Msg-1 is sent on beam 14 only.

RACH resources are grouped based on the BS receiving characteristics, such as the BS receiving beams. The BS uses DL beacon signals to select a DL beam pair at the UE. In doing so, exhaustive beam search between BS TX beams and the UE RX beams can be performed for DL beam tracking. A DL beam of the pair can be selected when the DL profile is acquired at the UE. Determining the RACH resources based on the association in broadcast channel transmitted by the BS TX beam of the selected DL beam pair.

Figure 7A:
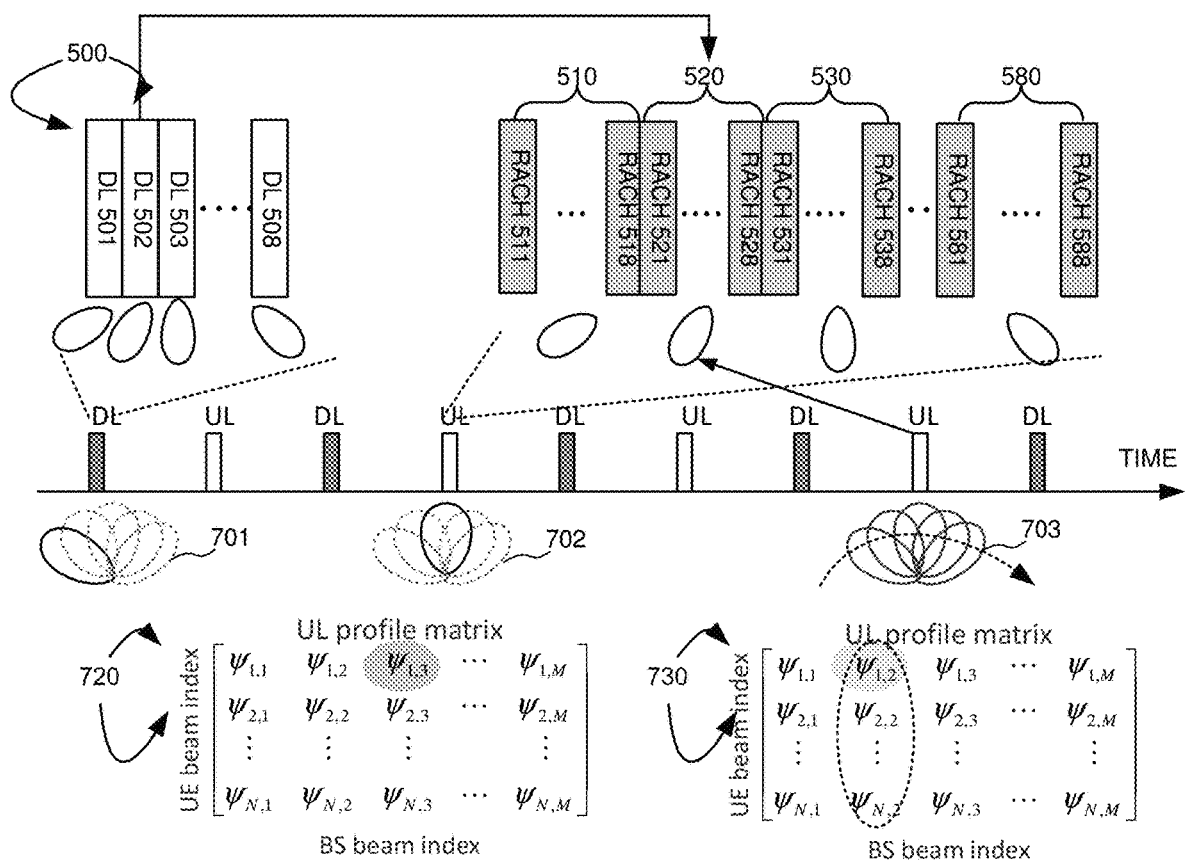
FIG. 7A illustrates exemplary diagrams for the first message, such as Msg-1 transmission for reciprocal BS configurations in accordance to embodiments of the current invention.

FIG. 7A illustrates exemplary diagrams for the first message, such as Msg-1 transmission for reciprocal BS configurations in accordance to embodiments of the current invention. The reciprocal BS RACH configuration 500 is configured. As an example, a reciprocal UE 702 and a non-reciprocal UE 703 perform initial access to the network. With UE reciprocity, the UE uses the determined UL beam for the first message, such Msg-1 transmission. In one embodiment, the determined UL beam is randomly selected by UE 702. In other embodiment, UE 702 selects a RACH resource based on predefined rules. In yet another embodiment, UE 702 selects the UL resource based on the DL measurement of the DL resources carrying information of whereabouts of the UL resources. Due to UE reciprocity, the TX beam matches to the UE RX beam. If the BS receives the preamble successfully, the BS learns the TX/RX beam which can be used to communicate with the UE. Due to the BS reciprocity, the BS TX beam matches the BS RX beam. The following BS Msg-2 transmission can be carried by using the newly determined BS TX beam. As an example, UE 702 selects BS TX beam-3 and UE Rx beam-1 based on DL measurement. Due to beam reciprocity at both BS and UE, UE decides BS RX beam-3 (which would correspond to one or multiple RACH occasions for msg-1 transmission) and UE TX beam-1 for attempting msg-1 transmission. After msg-1 TX, UL beamformed channel response is acquired, i.e., $\psi_{1,3}$. In one embodiment, there can be only one RACH occasion, corresponding to one BS DL beam, for transmitting msg-1. A non-reciprocal UE 703 sweeps through its UE TX beams on RACH resources to guarantee BS reception of the first message, such as Msg-1. If the BS receives the preamble successfully, the BS learns BS TX/RX beam, which can be used to communicate with UE 703. Due to the reciprocity, the BS TX beam matches the BS RX beam. The following BS Msg-2 transmission can be carried by using the newly determined BS TX beam. The UL profile 730 is acquired by UE 703 and DL beam-1 and UL beam-2 are selected. After UE sweeps through its UE TX beams, UL beamformed channel responses are acquired for channels between a BS RX beam and all UE TX beams, i.e., $\psi_{1,2}$, $\psi_{2,2}$, ..., $\psi_{N,2}$ in FIG. 7A. In one embodiment, there can be only one RACH occasion corresponding to one BS DL beam for transmitting msg-1. Thus, one UE TX beam has to be selected for transmission by UE.

Figure 7B:
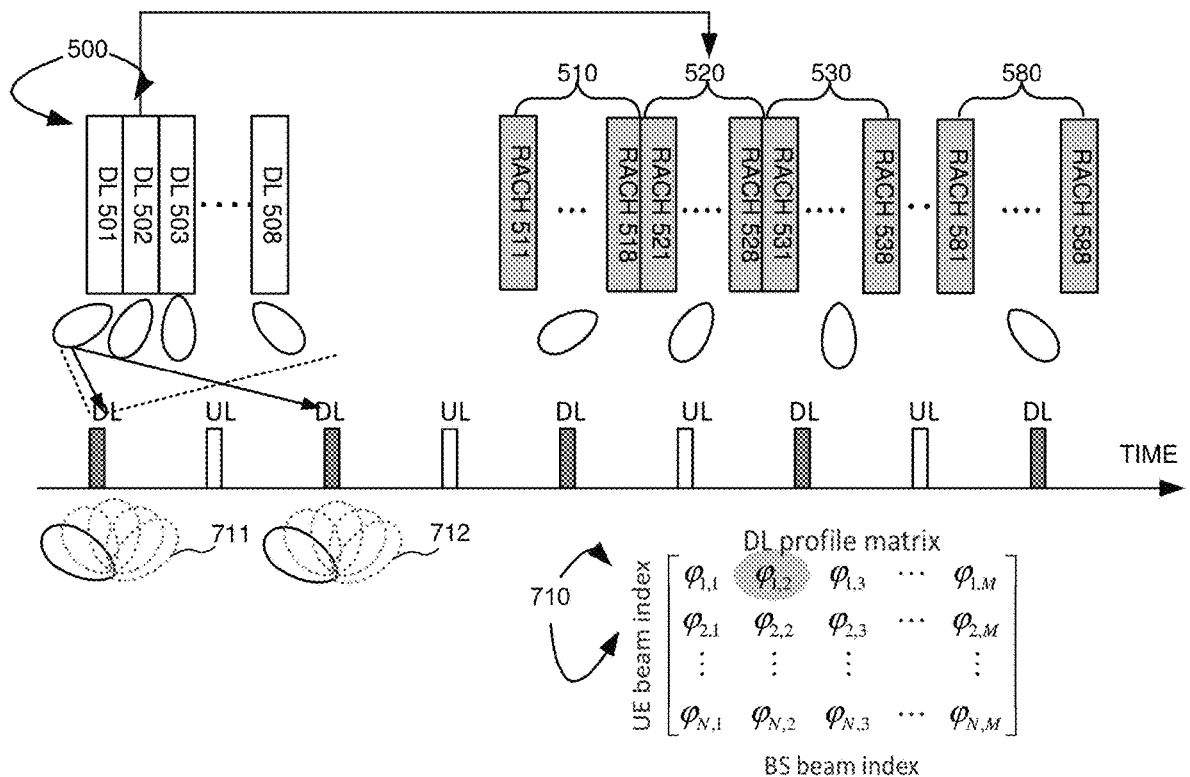
FIG. 7B illustrates exemplary diagrams for the first-message-response, such as Msg-2 transmission for reciprocal BS configurations in accordance to embodiments of the current invention.

FIG. 7B illustrates exemplary diagrams for the first-message-response, such as Msg-2 transmission for reciprocal BS configurations in accordance to embodiments of the current invention. The UE expects Msg-2 reception in the random access response (RAR) reception window by using its selected DL beam pair as indicated by DL profile matrix 710, which is acquired and used for selecting RACH resources by UE via DL measurement. Msg-2 includes the UE UL beam information, implicitly or explicitly, which can be used for UL transmission later. In one embodiment, Msg-2 includes an identifier to indicate a corresponding BS receiving resource. In one embodiment, the identifier is a function of time and frequency of the corresponding BS receiving resource. In one embodiment, the first-message-response message, such as Msg-2, is not limited to be transmitted on the control beam region. In one embodiment, Msg-2 is transmitted in the dedicated region but using a beamformer the same as the selected control beamformer.

Figure 7C:
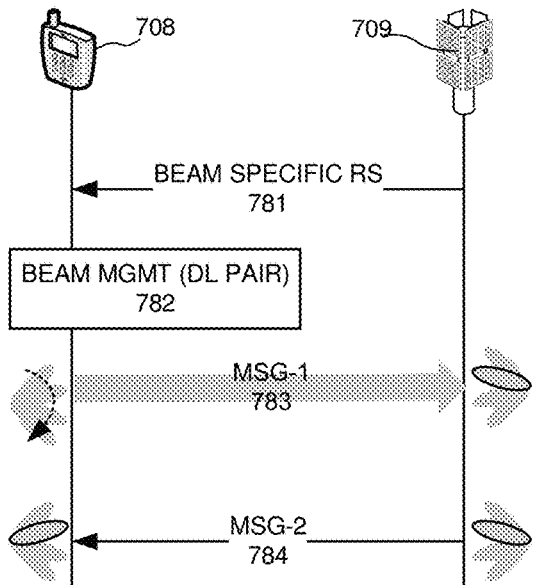
FIG. 7C illustrates exemplary flow chart for initial access for reciprocal BS configurations with non-reciprocal UE in accordance to embodiments of the current invention.

FIG. 7C illustrates exemplary flow chart for initial access for reciprocal BS configurations with non-reciprocal UE in accordance to embodiments of the current invention. A UE 708 performs an initial access with a BS 709. At step 781, BS 709 broadcasts beam specific reference signal (RS) with RACH resources configuration information. At step 782, UE 708 performs beam management and determines a preferred DL beam pair. Since UE 708 is non-reciprocal, at step 783, UE 708 sweeps through its TX beam and sends multiple Msg-1 to BS 709. BS 709 selects one received Msg-1 and replies a single Msg-2 to UE 708 at step 784. Msg-2 includes the UE UL beam information, implicitly or explicitly.

Figure 7D:
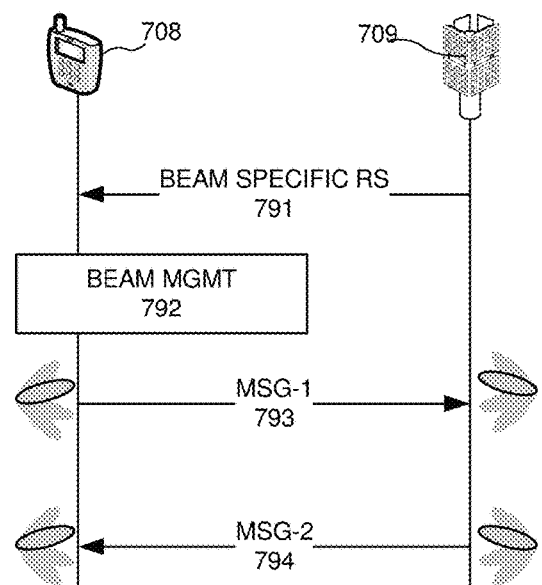
FIG. 7D illustrates exemplary flow chart for initial access for reciprocal BS configurations with reciprocal UE in accordance to embodiments of the current invention.

FIG. 7D illustrates exemplary flow chart for initial access for reciprocal BS configurations with reciprocal UE in accordance to embodiments of the current invention. A UE 708 performs an initial access with a BS 709. At step 791, BS 709 broadcasts beam specific reference signal (RS) with RACH resources configuration information. At step 792, UE 708 performs beam management. Since UE 708 is reciprocal, at step 793, UE 708 selects one beam and sends a Msg-1 to BS 709. BS 709 replies a single Msg-2 to UE 708 at step 794. Since the BS does not know the UE reciprocity capability, Msg-2 includes the UE UL beam information, implicitly or explicitly.

For non-reciprocal BS configurations, RACH resources are grouped based on BS receiving characteristics, such as the BS receiving beams. The UE uses the DL beacon signals to select a DL beam pair. By exhaustive beam search between BS TX beam, the UE RX beam can be performed for DL beam tracking. A DL beam pair can be selected when the DL profile matrix is measured at the UE. The UE determines RACH resource based on the association in broadcast channel transmitted by BS TX beam of the selected DL beam pair.

Figure 8A:
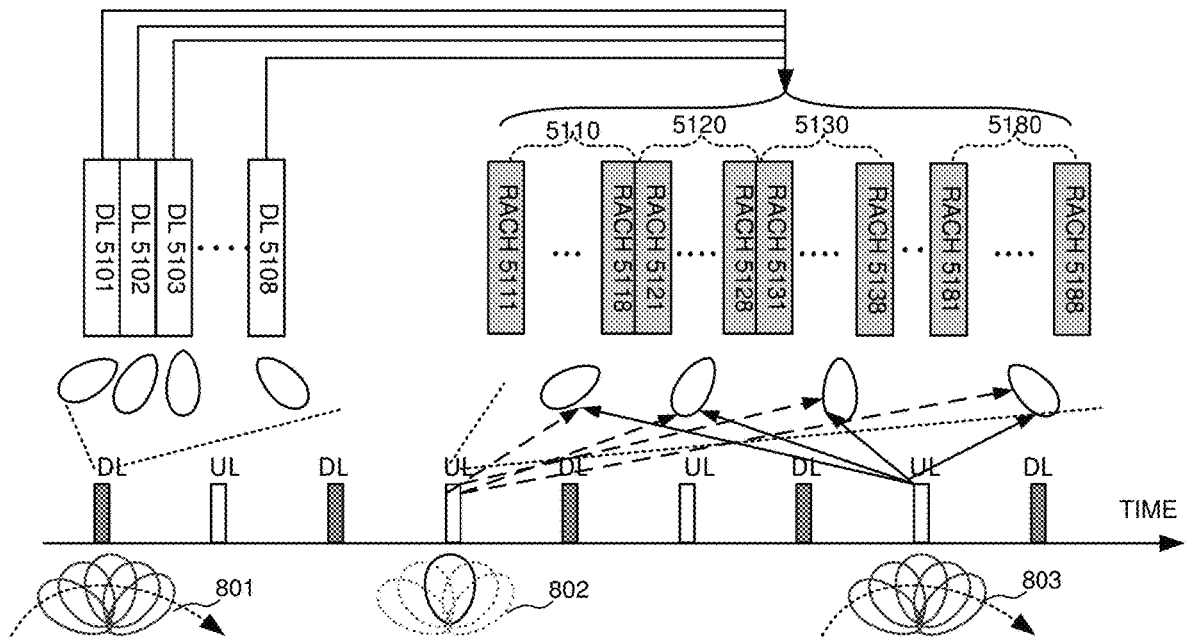
FIG. 8A illustrates exemplary diagrams for the first message, such as Msg-1 transmission for non-reciprocal BS configurations in accordance to embodiments of the current invention.
Figure 8A:
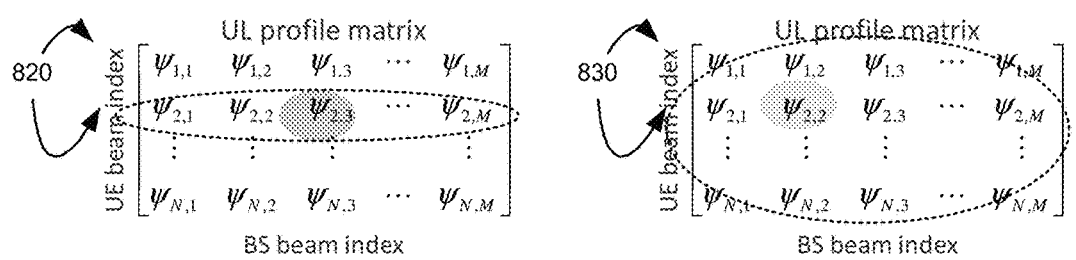

FIG. 8A illustrates exemplary diagrams for the first message, such as Msg-1 transmission for non-reciprocal BS configurations in accordance to embodiments of the current invention. The non-reciprocal BS RACH configuration 5100 is configured. As an example, a reciprocal UE 802 and a non-reciprocal UE 803 perform initial access to the network. With UE reciprocity, the UE uses the determined UL beam for the first message, such Msg-1 transmission. In one embodiment, the determined UL beam is randomly selected by UE 802. In other embodiment, UE 802 selects a RACH resource based on predefined rules. Due to UE reciprocity, the TX beam matches to the UE RX beam. If the BS receives the preamble successfully, the BS learns the TX/RX beam which can be used to communicate with the UE. If the BS receives the preamble successfully, the BS learns BS RX beam, which can be used to communication with UE 802. Without BS reciprocity, all BS TX beams are candidate beams for DL. As an example, UE 802 selects beam-3. UL profile 820 is acquired by UE 802. UE selects DL beam-2 and UL beam-3. A non-reciprocal UE 803 sweeps through its UE TX beams multiple time on RACH resources to guarantee BS reception of the first message, such as Msg-1. If the BS receives the preamble successfully, the BS learns BS TX/RX beam, which can be used to communicate with UE 803. Without BS reciprocity, all BS TX beams are candidate beams for DL. As an example, UE 802 selects beam-3. UL profile 830 is acquired by UE 803. UE selects DL beam-2 and UL beam-3.

Figure 8B:
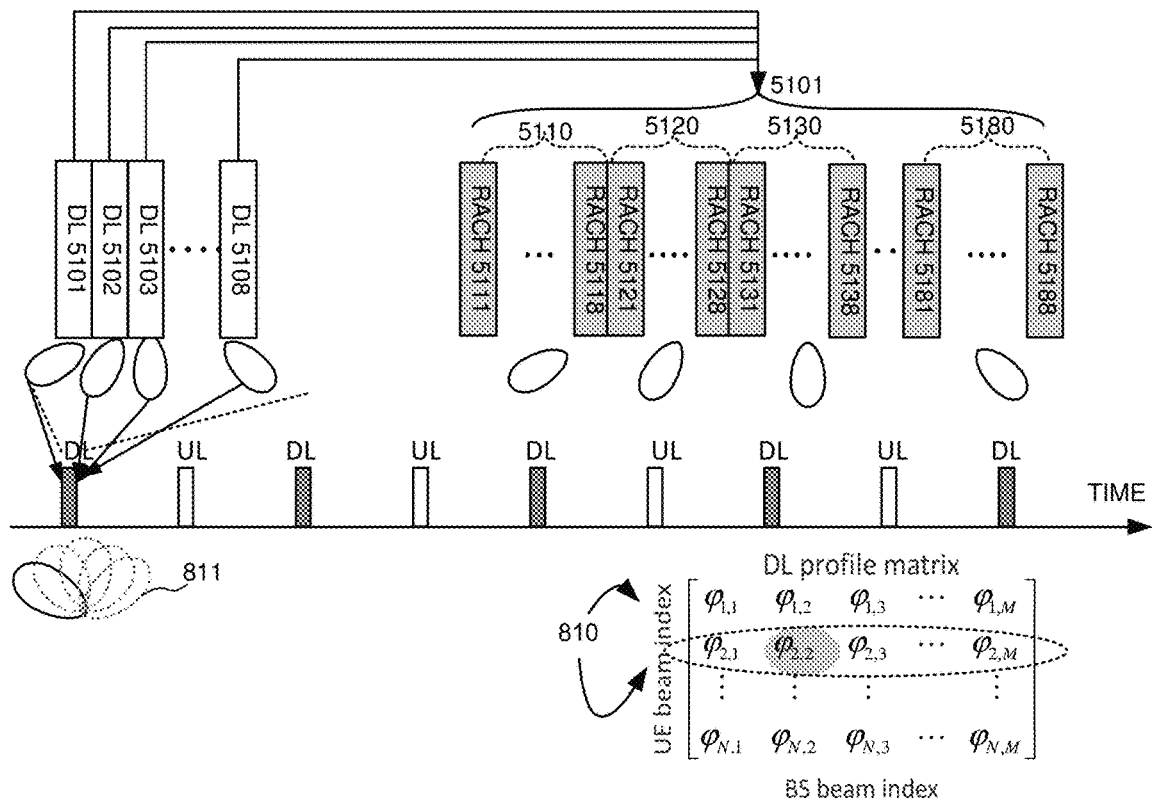
FIG. 8B illustrates exemplary diagrams for the first-message-response, such as Msg-2 transmission for non-reciprocal BS configurations in accordance to embodiments of the current invention.

FIG. 8B illustrates exemplary diagrams for the first-message-response, such as Msg-2 transmission for non-reciprocal BS configurations in accordance to embodiments of the current invention. The UE expects Msg-2 reception in RAR reception window by using selected DL beam pair. BS Msg-2 transmission is performed repeatedly by sweeping through all BS TX beams. Msg-2 includes UE UL beam information, which can be used for UL transmission. In one embodiment, the first-message-response message, such as Msg-2, is not limited to be transmitted on the control beam region. In one embodiment, Msg-2 is transmitted in the dedicated region but using a beamformer the same as the selected control beamformer. The UE replies with Msg-3, which includes BS TX beam indication to the BS.

Figure 8C:
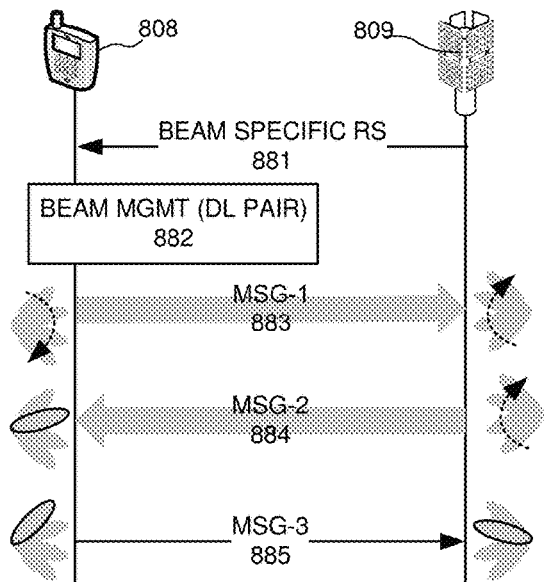
FIG. 8C illustrates exemplary flow chart for initial access for non-reciprocal BS configurations with non-reciprocal UE in accordance to embodiments of the current invention.

FIG. 8C illustrates exemplary flow chart for initial access for non-reciprocal BS configurations with non-reciprocal UE in accordance to embodiments of the current invention. A UE 808 performs an initial access with a BS 809. At step 881, BS 809 broadcasts beam specific reference signal (RS) with RACH resources configuration information. At step 882, UE 808 performs beam management and establishes DL pair. Since UE 808 is non-reciprocal, at step 883, UE 808 sweeps through its TX beam and sends multiple Msg-1 to BS 809. BS 809 selects one received Msg-1 and sweeps through its TX beams to send multiple Msg-2 to UE 808 at step 884. Msg-2 includes the UE UL beam information. At step 885, UE 808 sends Msg-3 to BS 809. Msg-3 includes BS TX beam indication.

Figure 8D:
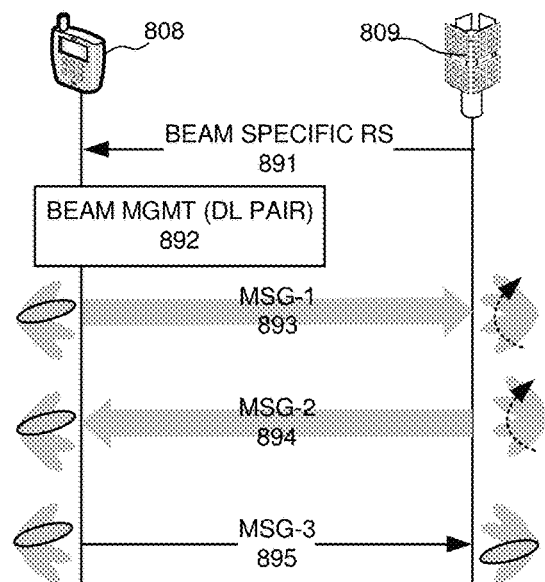
FIG. 8D illustrates exemplary flow chart for initial access for non-reciprocal BS configurations with reciprocal UE in accordance to embodiments of the current invention.

FIG. 8D illustrates exemplary flow chart for initial access for non-reciprocal BS configurations with reciprocal UE in accordance to embodiments of the current invention. A UE 808 performs an initial access with a BS 809. At step 891, BS 809 broadcasts beam specific reference signal (RS) with RACH resources configuration information. At step 892, UE 808 performs beam management and establishes DL pair. Since UE 808 is reciprocal, at step 893, UE 808 selects a subset of RACH resources sweeping through BS RX beams and sends multiple Msg-1 messages to BS 809. BS 809 selects one received Msg-1 and sweeps through its TX beams to send multiple Msg-2 to UE 808 at step 894. Msg-2 includes the UE UL beam information. At step 895, UE 808 sends Msg-3 to BS 809. Msg-3 includes BS TX beam indication.

In one embodiment, both BS and UE are reciprocal, which means the BS and all UEs are fully reciprocal. The association procedure is simplified based on this assumption.

Figure 9A:
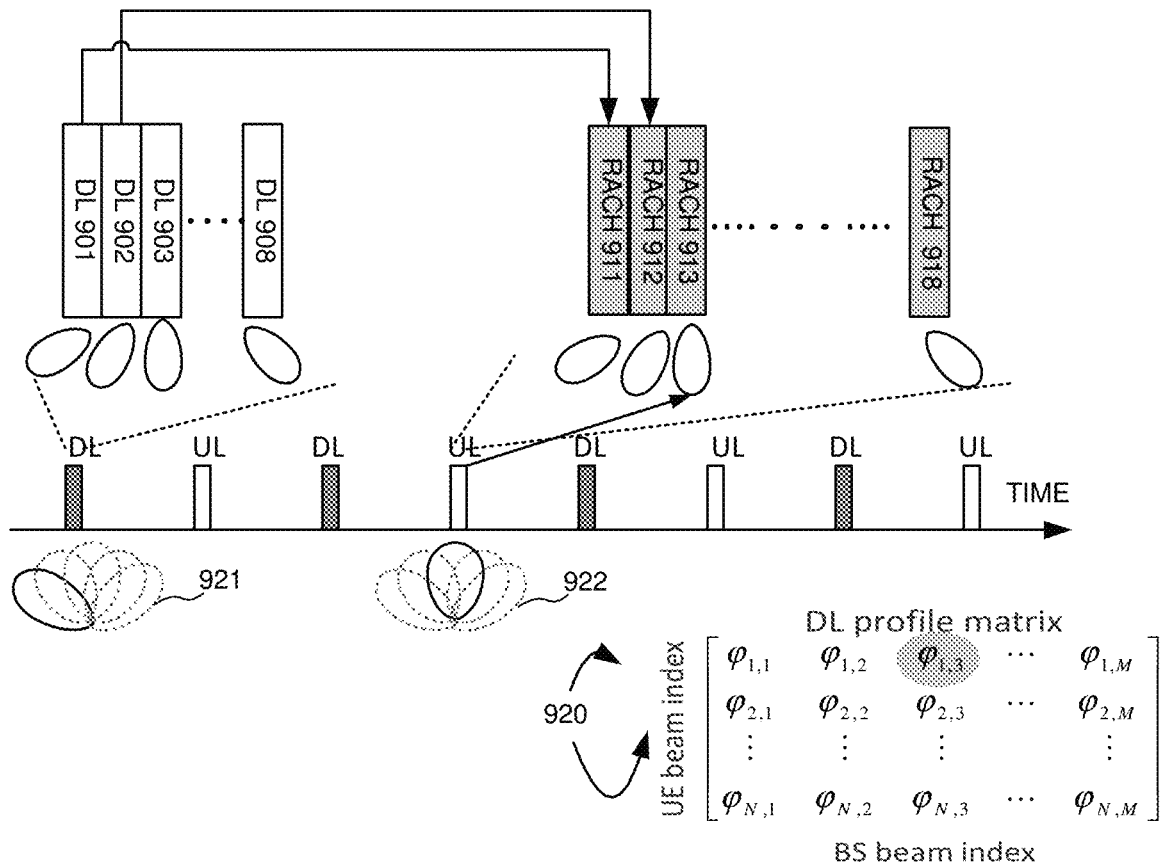
FIG. 9A illustrates exemplary diagrams for resource configurations for both BS and UE with reciprocity in accordance to embodiments of the current invention.

FIG. 9A illustrates exemplary diagrams for resource configurations for both BS and UE with reciprocity in accordance to embodiments of the current invention. The UE uses DL beacon signals to select a beam pair. The exhaustive beam searching between BS TX beam and the UE RX beam is performed. A beam pair is selected when the DL profile matrix is measured at the UE. The RACH resource is determined based on the association in broadcast channel transmitted by the BS TX beam of the selected beam pair. Using the selected UE TX beam for preamble transmission on the determined RACH resources. Due to reciprocity, the UE RX beam matches the UE TX beam. If the BS receives the preamble successfully, the BS learns the BS TX/RX beam, which can be used to communicate with the UE. Due to reciprocity, the BS RX beam matches the BS TX beam. The following Msg-2 transmission can be carried by using the newly determined BS TX/RX beam. The UE expects Msg-2 reception in RAR reception window by using its selected beam pair. As shown, each DL channels, such as DL 901, 902, 903, and 908 is configured with one RACH resource. DL 901, 902, 903, and 908 are configured with RACH 911, 912, 913, and 918, respectively. The UE acquires DL profile 920 and determines the DL beam-1 and UL beam-3 are used.

Figure 9B:
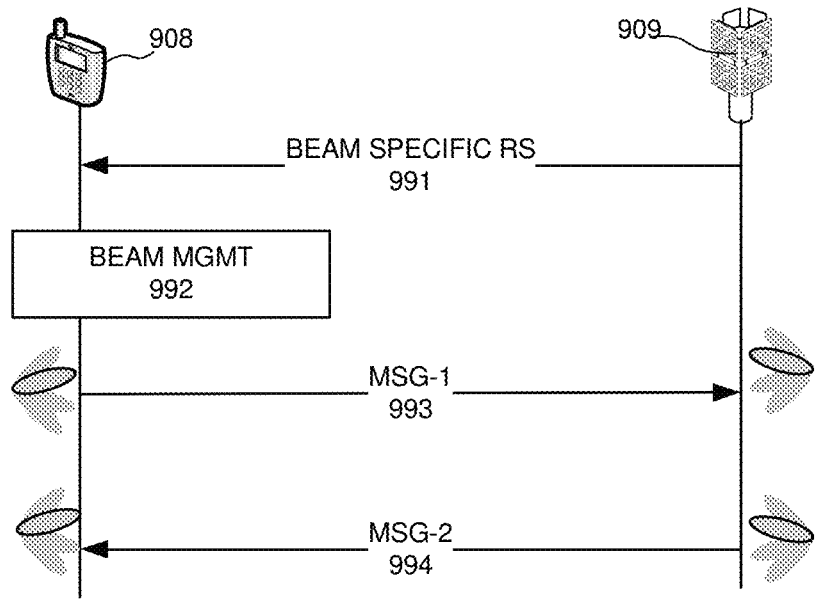
FIG. 9B illustrates exemplary flow chart for initial access for both BS and UE with reciprocity in accordance to embodiments of the current invention.

FIG. 9B illustrates exemplary flow chart for initial access for both BS and UE with reciprocity in accordance to embodiments of the current invention. A UE 908 performs an initial access with a BS 909. At step 991, BS 909 broadcasts beam specific reference signal (RS) with RACH resources configuration information. At step 992, UE 908 performs beam management and establishes DL pair. Since UE 908 is reciprocal, at step 993, UE 908 select one TX beam and send a Msg-1 to BS 909. BS 909 sends a Msg-2 to UE 908 at step 994. Since both the UE and the BS are reciprocal, the RACH resource configuration is simplified.

A reciprocity indicates a one-to-one mapping between the TX and the RX beamformer. A partial reciprocity indicates a correlated relationship between the TX and the RX beams can be used. Both the UE and the BS can be partially reciprocal.

Figure 10A:
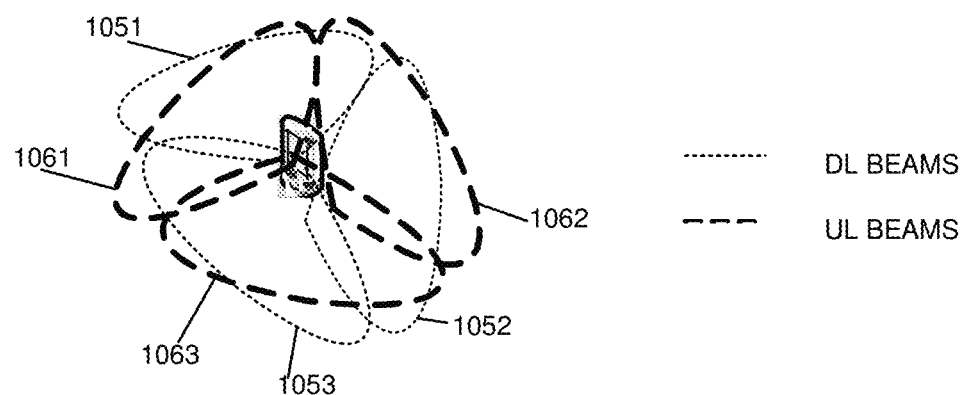
FIG. 10A illustrates exemplary diagrams for the partial reciprocal BS configurations in accordance to embodiments of the current invention.
Figure 10A:
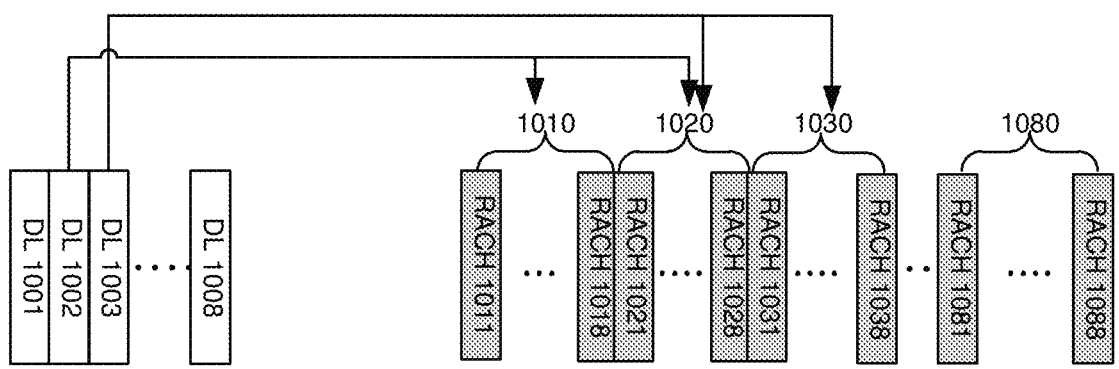

FIG. 10A illustrates exemplary diagrams for the partial reciprocal BS configurations in accordance to embodiments of the current invention. An exemplary partial reciprocal UE is shown with three UL beams 1061, 1062, and 1063 and three DL beams 1051, 1052, and 1053. The DL beam 1051 is correlated with UL beams 1061 and 1062. The DL beam 1052 is correlated with UL beams 1062 and 1063. The DL beam 1053 is correlated with UL beams 1063 and 1061. As shown, the configuration for partial reciprocity has one DL channel correlates a subset of the RACH resource pool. Multiple DL channels DL 1001, 1002, 1003, and 1008 are configured. The RACH resources are configured with groups of 1010 including RACH resources such as 1011 and 1018, groups of 1020 including RACH resources such as 1021 and 1028, groups of 1030 including RACH resources such as 1031 and 1038, and groups of 1080 including RACH resources such as 1081 and 1088. As an example, DL 1002 is configured with RACH groups 1010 and 1020. DL 1003 is configured with RACH groups 1020 and 1030.

Figure 10B:
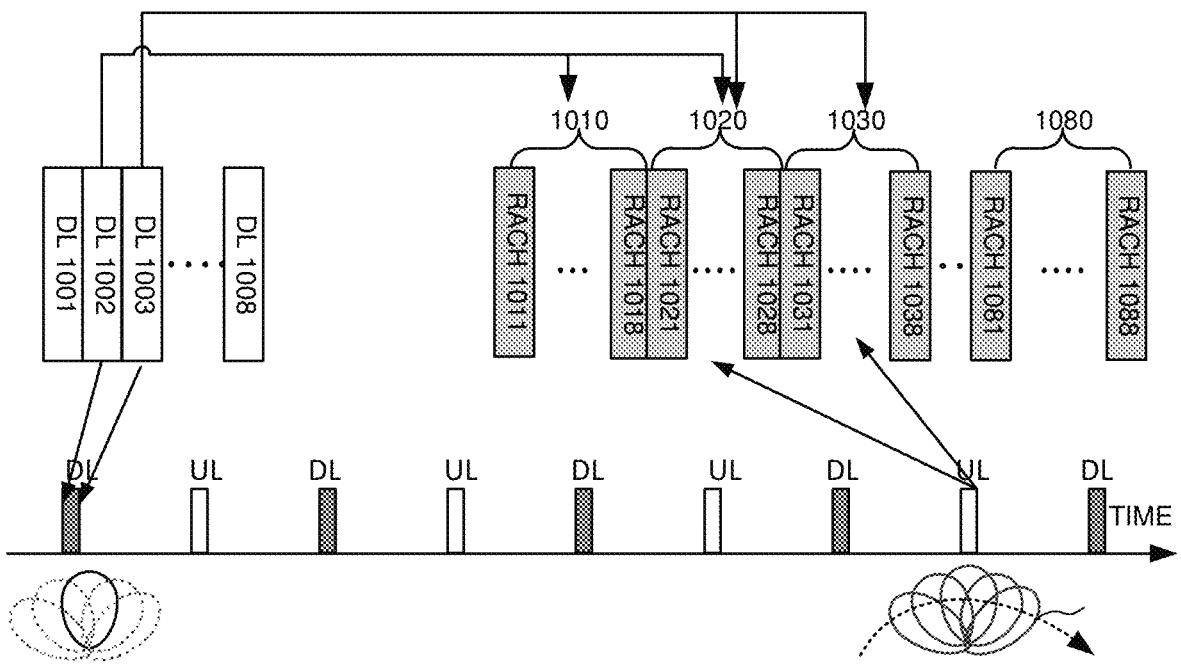
FIG. 10B illustrates exemplary diagrams for the initial access procedure for partial BS configurations in accordance to embodiments of the current invention.

FIG. 10B illustrates exemplary diagrams for the initial access procedure for partial BS configurations in accordance to embodiments of the current invention. Without UE reciprocity, the UE sweeps through its UE TX beams on RACH resources to guarantee BS reception of MSg-1. If BS receives preamble successfully, the BS learns BS RX beam, which can be used to communicate with the UE. Due to partial reciprocity, the candidate BS TX beams are determined based on the BS RX beam. The UE expects Msg-2 reception on RAR reception window by using the selected DL beam pair. BS Msg-2 transmission can be carried by using the newly determined candidate BS TX beams. Msg-2 includes UE TX beam information, which can be used for the UL transmission. Msg-3 includes BS TX beam indication to the BS.

Figure 10C:
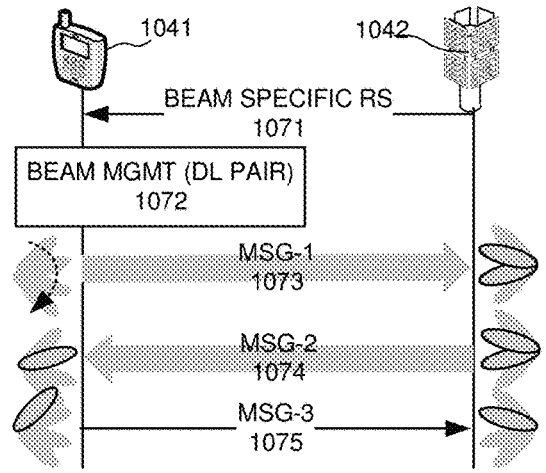
FIG. 10C illustrates exemplary flow chart for initial access for partial reciprocal BS configurations in accordance to embodiments of the current invention.

FIG. 10C illustrates exemplary flow chart for initial access for partial reciprocal BS configurations in accordance to embodiments of the current invention. A UE 1041 performs an initial access with a BS 1042. At step 1071, BS 1042 broadcasts beam specific reference signal (RS) with RACH resources configuration information. At step 1072, UE 1041 performs beam management and establishes DL pair. Since UE 1041 is partial reciprocal, at step 1073, UE 708 sweeps through a subset of its TX beam and sends multiple Msg-1 to BS 1042. BS 1042 selects one received Msg-1 and sweeps through a subset of its TX beams to send multiple Msg-2 to UE 1041 at step 1074. Msg-2 includes the UE UL beam information. At step 1075, UE 1041 sends Msg-3 to BS 1042. Msg-3 includes BS TX beam indication.

In one embodiment, only one control beam is configured. The control beam provides the whole coverage for the cell. There is only one DL broadcast channel providing a single association configuration to the RACH resources. The DL beam knowledge cannot be gained in the background before the initial access. The association is one-to-all.

Figure 11A:
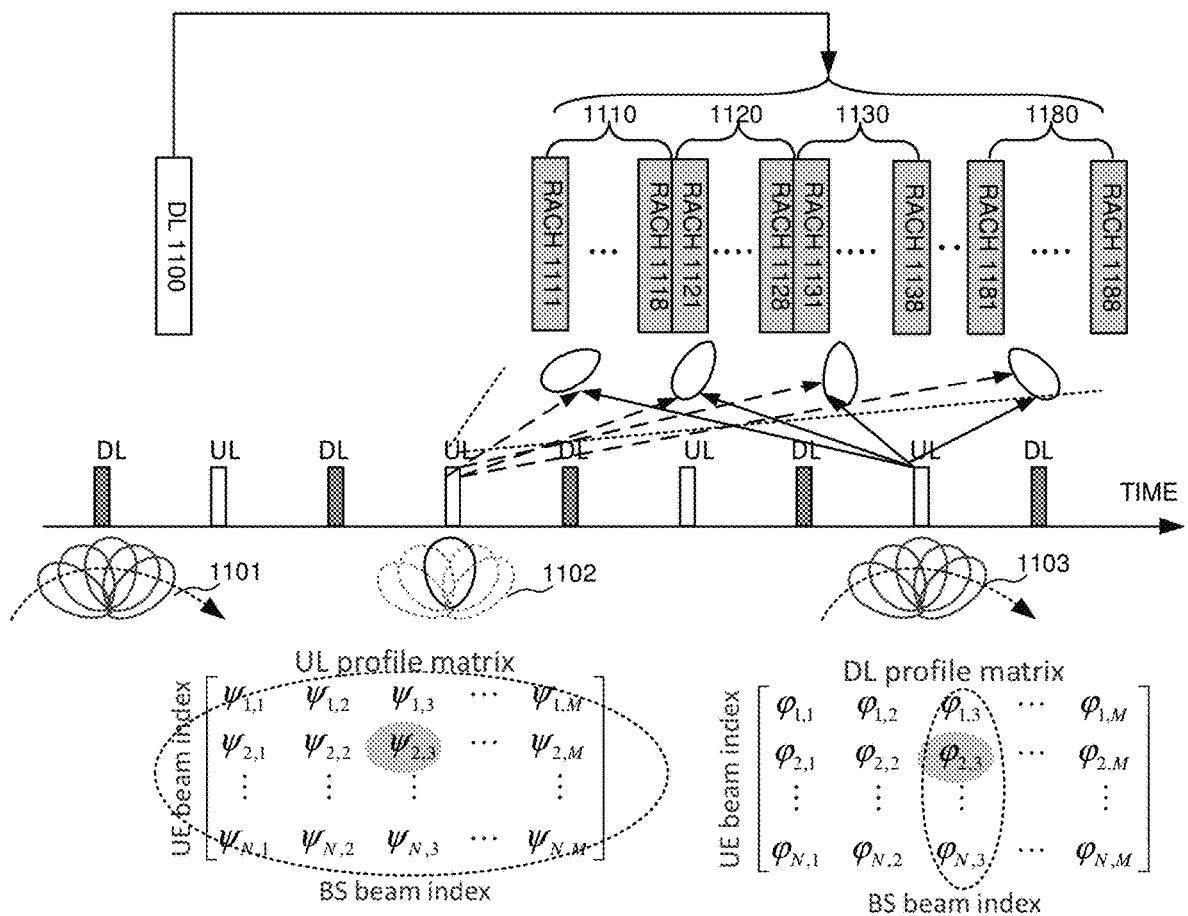
FIG. 11A illustrates exemplary diagrams for the single-control beam configuration and initial access procedure in accordance with embodiments of the current invention.

FIG. 11A illustrates exemplary diagrams for the single-control beam configuration and initial access procedure in accordance with embodiments of the current invention. A single DL channel 1100 is configured with the entire RACH resources including RACH group 1110 with RACH resource such as RACH 1111 and RACH 1118, RACH group 1120 with RACH resource such as RACH 1121 and RACH 1128, RACH group 1130 with RACH resource such as RACH 1131 and RACH 1138, RACH group 1180 with RACH resource such as RACH 1181 and RACH 1188. A reciprocal UE 1102 and non-reciprocal UE 1103 perform initial access to the single control beam network. With or without UE reciprocity, the UE sweeps through its UE TX beams multiple times on RACH resources to guarantee BS reception of Msg-1. If the BS receives preamble successfully, the BS learns BS RX beam, which can be used to communicate with the UE. Without the BS reciprocity, all BS TX beams are candidate beams for DL. With the BS reciprocity, the BS TX beam matches the BS RX beam. With BS reciprocity, BS transmits Msg-2 by using the selected BS TX beam for a number of times. The number of Msg-2 transmissions is for the UE to try its individual UE beams for reception. Msg-2 includes the UE TX beam information, implicitly or explicitly, which can be used for the UL transmission. In one embodiment, BS only transmit msg-2 for one time and UE needs to decide one UE RX beam for reception. Without BS reciprocity, the BS transmits Msg-2 by sweeping through all BS TX beams multiple times. It provides exhaustive beam search opportunities at the UE side. Msg-2 includes the UE TX beam information, which can be used for UL transmission. With or without UE reciprocity, the UE transmits Msg-3 by the indicated UE TX beam. Since Msg-3 is a scheduled transmission, the BS expects it by using its selected RX beam for reception. In case of non-reciprocal BS, Msg-3 includes BS TX beam indication.

Figure 11B:
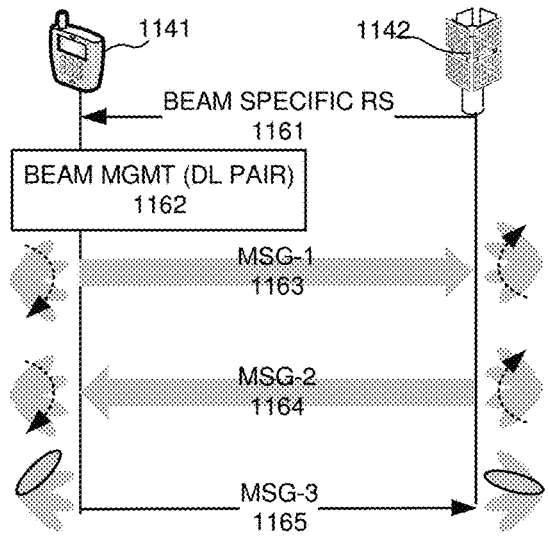
FIG. 11B illustrates exemplary flow chart of a UE for initial access with single control beam configuration for a non-reciprocal BS in accordance to embodiments of the current invention.

FIG. 11B illustrates exemplary flow chart of a UE for initial access with single control beam configuration with a non-reciprocal BS in accordance to embodiments of the current invention. A UE 1141 performs an initial access with a BS 1142. At step 1161, BS 1142 broadcasts beam specific reference signal (RS) with RACH resources configuration information. At step 1162, UE 1141 performs beam management and establishes DL pair. At step 1163, UE 1141 sweeps through RACH resources and sends multiple Msg-1 messages to BS 1142. BS 1142 selects one received Msg-1. Since BS 1142 is non-reciprocal, it sweeps through its TX beams to send multiple Msg-2 to UE 1141 at step 1164. Msg-2 includes the UE UL beam information. At step 1165, UE 1141 sends Msg-3 to BS 1142. Msg-3 includes BS TX beam indication.

Figure 11C:
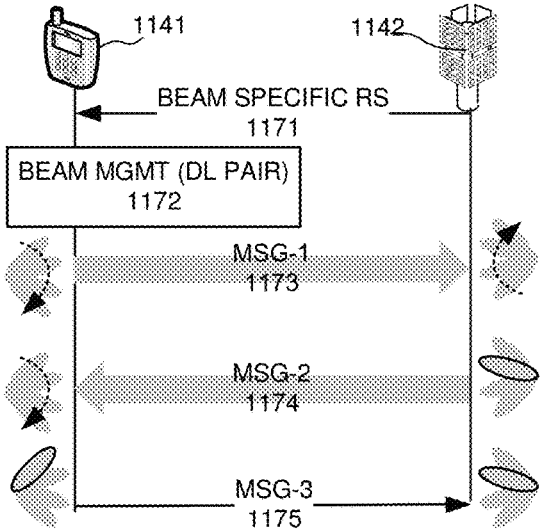
FIG. 11C illustrates exemplary flow chart of a UE for initial access with single control beam configuration for a reciprocal BS in accordance to embodiments of the current invention.

FIG. 11C illustrates exemplary flow chart of a UE for initial access with single control beam configuration with a reciprocal BS in accordance to embodiments of the current invention. A UE 1141 performs an initial access with a BS 1142. At step 1171, BS 1142 broadcasts beam specific reference signal (RS) with RACH resources configuration information. At step 1172, UE 1141 performs beam management and establishes DL pair. At step 1173, UE 1142 sweeps through RACH resources and sends multiple Msg-1 messages to BS 1142. BS 1142 selects one received Msg-1. Since BS 1142 is reciprocal, it selects one TX beam and applies the selected TX beam to send Msg-2 for a number of times to UE 1141 at step 1174. Msg-2 includes the UE UL beam information, implicitly or explicitly. At step 1175, UE 1141 sends Msg-3 to BS 1142.

The RACH procedures are used in initial access procedures. In principle, a four-step RACH procedure is used. However, since the third and the fourth step are scheduled transmissions, a two-step RACH procedure can be used as well. With the two-step RACH procedure, information to be carried in the third and the fourth step can be potentially carried in the first step of the two-step RACH procedure. The legacy RACH procedure also applies but is subject to several enhancements. First, multiple Msg-1 needs to be mapped to a single RAR. Second, consecutive RAR can be transmitted with different TX beamformers. The RAR can also be transmitted with the same TX beamformers. RA-RNTI determination includes the signaling of UE TX beam.

In one embodiment, virtual RACH resource is configured. The total RACH pool is divided into groups. Each individual group corresponds to different BS receiving characteristics, or spatial characteristics, such as the RX beams. With each RACH resource group, it is further divided into subset. The virtual RACH resource includes multiple RACH resources, each of them can be one-to-one mapped to individual RACH subset of the same RACH group. A virtual RACH resource includes RACH resources from all sets of RACH groups. Selection of a RACH resources from a subset determines other members of a virtual RACH resource at the same time.

Figure 12:
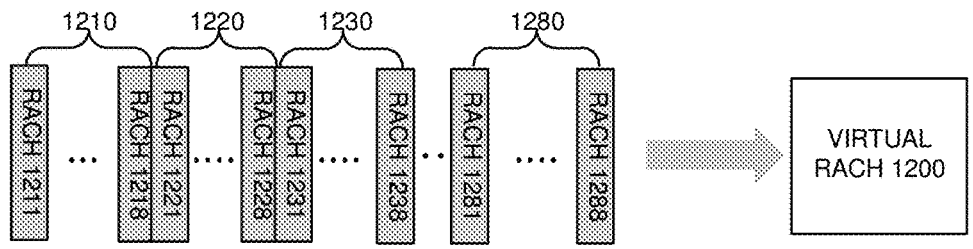
FIG. 12 illustrates exemplary diagrams for virtual RACH resource with linkage of Msg-1 and Msg-2 in accordance with embodiments of the current invention.

FIG. 12 illustrates exemplary diagrams for virtual RACH resource with linkage of Msg-1 and Msg-2 in accordance with embodiments of the current invention. The RACH resource are grouped in multiple set including RACH group 1210 with RACH resources such as RACH 1211 and 1218, RACH group 1220 with RACH resources such as RACH 1221 and 1228, RACH group 1230 with RACH resources such as RACH 1231 and 1238, RACH group 1280 with RACH resources such as RACH 1281 and 1288. The RACH groups can be mapped to virtual RACH group 1200. There is one RA response for a number of Msg-1 transmissions corresponding to e.g., a RACH group. Msg-1 TX on different RACH resources in one RACH resource group can correspond to different UE transmitting behaviors, such as UE TX beams. The RA-RNTI is used for RAR of a msg-1 transmission on a RACH resource which corresponds to a preferred reception of the Msg-1 transmissions. Note that RA-RNTI is similar to LTE practice, which is a function of time and frequency resources of a received msg-1 transmission. It then indicates a preferred combination of the UE TX behavior and BS RX behavior. With such choice of RA-RNTI, the selected UE TX beam by BS is signaled to the UE in Msg-2. In one embodiment, there could be multiple RAR transmissions of the same RAR contents, with each of RAR transmission corresponding to a successfully received msg-1 by BS. In another embodiment, BS transmits RAR for one time and the RAR transmission corresponds to a preferred msg-1 reception determined by BS. The selection can be e.g., based on received signal power strength, or SINR, or other quality measure for experienced UL channel.

Figure 13:
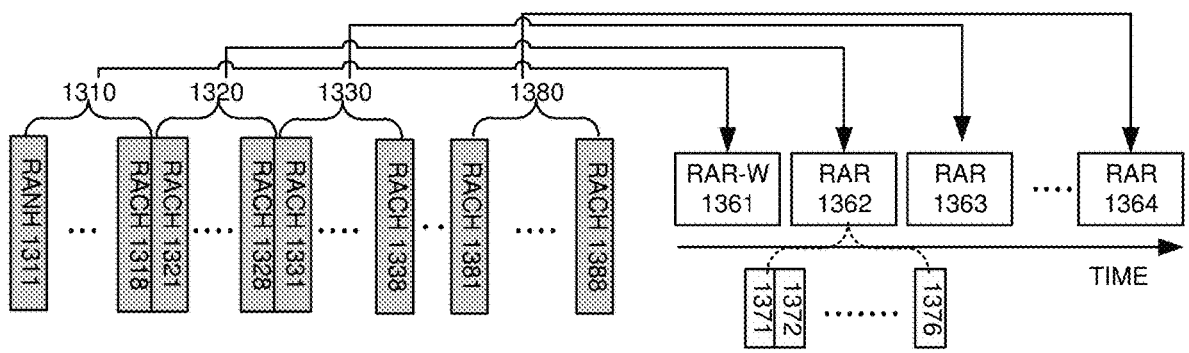
FIG. 13 illustrates exemplary diagrams of RAR window configuration in accordance with embodiments of the current invention.

FIG. 13 illustrates exemplary diagrams of RAR window configuration in accordance with embodiments of the current invention. The RACH resource are grouped in multiple set including RACH group 1310 with RACH resources such as RACH 1311 and 1318, RACH group 1320 with RACH resources such as RACH 1321 and 1328, RACH group 1330 with RACH resources such as RACH 1331 and 1338, RACH group 1380 with RACH resources such as RACH 1381 and 1388. RAR window starts after all possible Msg-1 transmission ends. The RAR window position is specified, signaled by the network, or both. In one embodiment, different RAR window are configured correlates to different RACH groups for BS TX sweeping. RACH group 1310 is configured for RAR window 1361. RACH group 1320 is configured for RAR window 1362. RACH group 1330 is configured for RAR window 1363. RACH group 1380 is configured for RAR window 1364. In one embodiment, the RAR windows can overlap. In one embodiment, each of the RAR windows 1361, 1362, 1363, and 1364 can further configured to sub-windows for UE RX beam sweeping. RAR window 1362 can be further divided into sub-windows such as 1371, 1372, and 1376.

Figure 14:
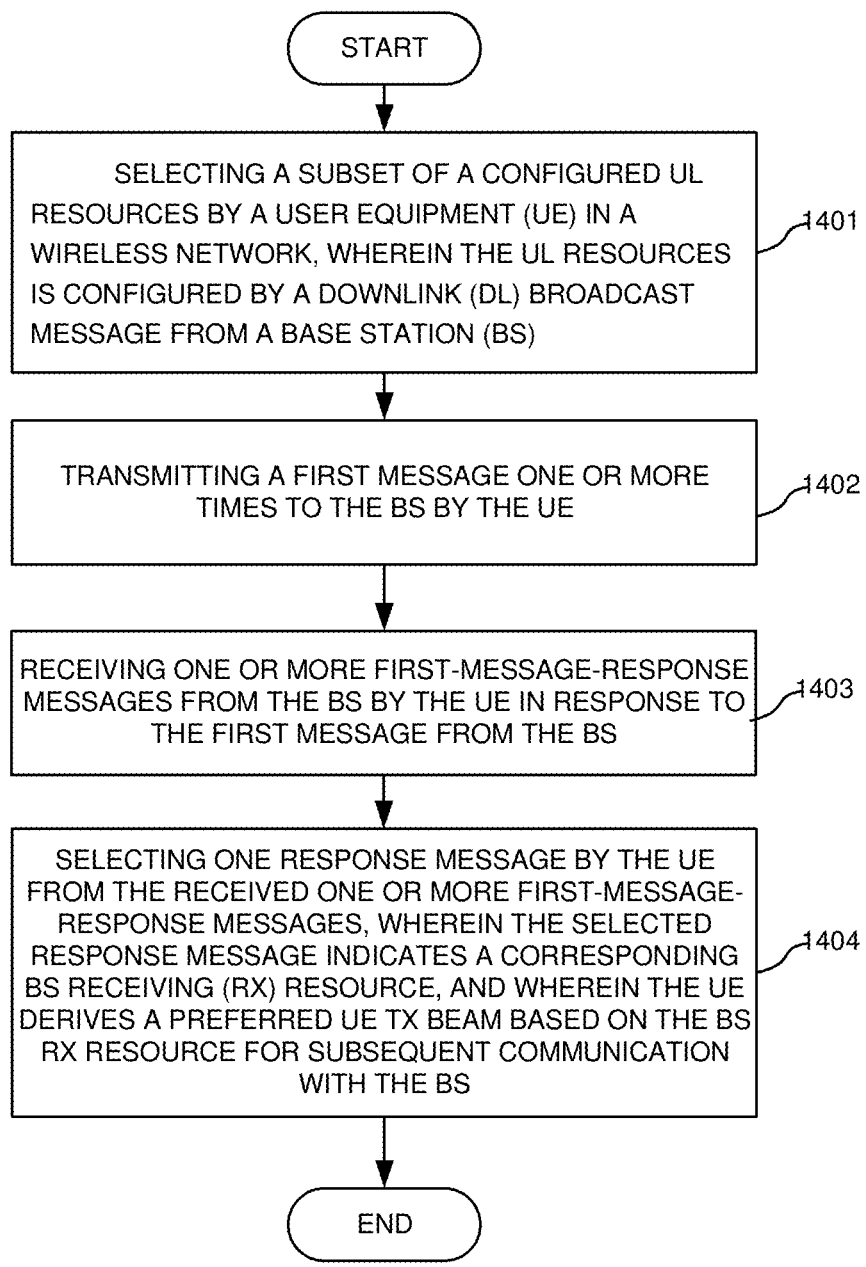
FIG. 14 illustrates an exemplary flow chart for the UE initial access procedure for multi-beam operation in accordance with embodiments of the current invention.

FIG. 14 illustrates an exemplary flow chart for the UE initial access procedure for multi-beam operation in accordance with embodiments of the current invention. At step 1401, the UE selects a subset of a configured UL resources in a wireless network, wherein the UL resources is configured by a downlink (DL) broadcast message from a base station (BS). At step 1402, the UE transmits a first message to the BS by the UE, wherein the first message is transmitted one or more times on the selected set of UL resources. At step 1403, the UE receives one or more first-message-response messages from the BS by the UE in response to the first message from the BS. At step 1404, the UE selects one response message by the UE from the received one or more first-message-response messages, wherein the selected response message can indicate a corresponding BS receiving (RX) resource, based on which the UE can derive a UE TX beam that is preferred for subsequent communication with the BS.

Figure 15:
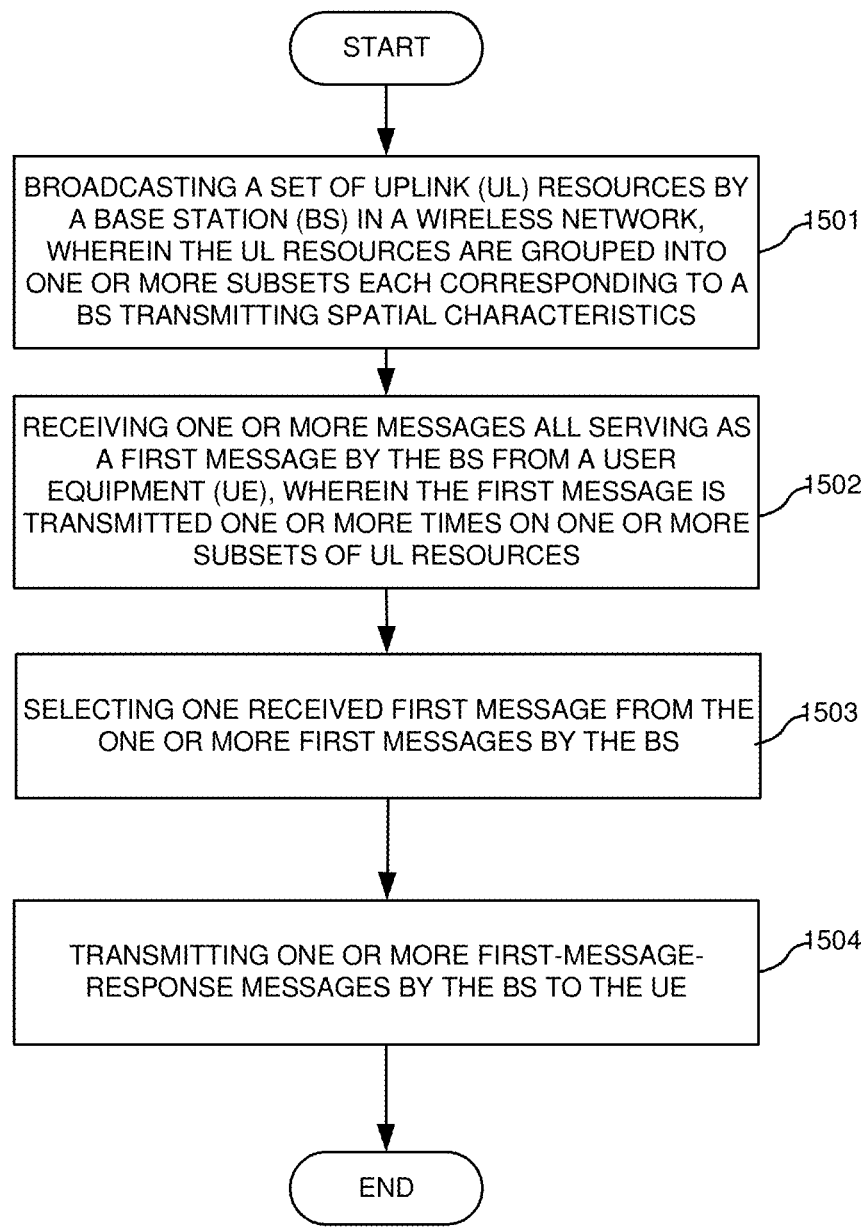
FIG. 15 illustrates an exemplary flow chart for the BS initial access procedure for multi-beam operation in accordance with embodiments of the current invention.

FIG. 15 illustrates an exemplary flow chart for the BS initial access procedure for multi-beam operation in accordance with embodiments of the current invention. At step 1501, the base station broadcasts a set of uplink (UL) resources by in a wireless network, wherein the UL resources are grouped into one or more subsets each corresponding to a BS transmitting spatial characteristics. At step 1502, the base station receives one or more messages all serving as a first message by the BS from a UE, wherein the first message is transmitted one or more times on one or more subsets of UL resources. At step 1503, the base station selects one received first message from the one or more first messages by the BS. At step 1504, the base station transmits one or more first-message-response messages by the BS to the UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
selecting a subset of a configured uplink (UL) resources by a user equipment (UE) in a wireless network, wherein the UL resources is configured by a downlink (DL) broadcast message from a base station (BS), and wherein the selecting a subset of the configured UL resources is based on a UE beam reciprocity, which indicates whether the UE is reciprocal, partial reciprocal, or non-reciprocal, and wherein the UE is reciprocal if the UE is able to determine a UE RX beam for the DL reception based on BS's UL measurement on UE's one or more TX beams, and the UE is able to determine a UE TX beam for the UL transmission based on UE's DL measurement on UE's one or more RX beams, and wherein the UE is partial reciprocal if only the TX beam or the RX beam is reciprocal;
transmitting a first message one or more times to the BS by the UE;
receiving one or more first-message-response messages from the BS by the UE in response to the first message from the BS; and
selecting one response message by the UE from the received one or more first-message-response messages, wherein the selected response message indicates a corresponding BS receiving (RX) resource, and wherein the UE derives a preferred UE TX beam based on the BS RX resource for subsequent communication with the BS.

2. The method of claim 1, wherein the selection of UL resources is at least based on a UE DL measurement result on DL resources used to carry information of whereabouts of UL resources.

3. The method of claim 1, wherein the selection of UL resources is based on the UE beam reciprocity state, where a beam reciprocal UE selects one UL resource for one transmission attempt, and a non-beam reciprocal UE selects multiple UL resources for multiple transmission attempts.

4. The method of claim 1, wherein the selection of UL resources is at least based on a BS transmitting spatial characteristics, wherein a reciprocal BS has complete TX and RX beam reciprocity, a partial reciprocal BS has partial TX and RX beam reciprocity, and a non-reciprocal BS has no TX and RX beam reciprocity.

5. The method of claim 4, wherein one or more first messages are transmitted on each of the entire configured UL resources corresponding to different BS receiving characteristics if the BS is non-reciprocal.

6. The method of claim 4, wherein one or more first messages are transmitted on each of a subset of the entire configured UL resources if the BS is partial reciprocal.

7. The method of claim 4, wherein one or more first messages are transmitted on one corresponding configured UL resource if the BS is reciprocal.

8. The method of claim 1, wherein the transmitting of the first message is at least based on a UE transmitting spatial characteristics, which indicates whether the UE is reciprocal, partial reciprocal or non-reciprocal, wherein a reciprocal UE has complete TX and RX beam reciprocity, a partial reciprocal UE has partial TX and RX beam reciprocity, and a non-reciprocal BS has no TX and RX beam reciprocity.

9. The method of claim 8, wherein UE transmitting spatial characteristics that is used for the transmitting of the first message is determined by UE based on UE beam reciprocity state.

10. The method of claim 9, wherein if multiple UL resources are selected, different UE transmitting spatial characteristics are applied for different UL resources for the transmitting of the first message.

11. The method of claim 9, wherein if one UL resource is selected, the selected UE transmitting spatial characteristic for the transmitting of the first message is beam reciprocal or a preferred UE receiving spatial characteristic determined during DL measurements on DL beams that are used to carry information of whereabouts of UL resources.

12. The method of claim 8, wherein a plurality of the first message is transmitted on each corresponding selected UL resources if the UE is non-reciprocal or partial reciprocal.

13. The method of claim 12, wherein the UE applies different spatial characteristics to for the plurality of first message transmitted on each corresponding UL resources.

14. The method of claim 1, wherein the UL resources are configured in multiple sets, and wherein each set of the UL resource corresponds to a BS TX characteristic.

15. The method of claim 1, wherein the first message is transmitted a plurality of times on each of the selected set of UL resources.

16. The method of claim 1, wherein only one response message is received by the UE and an identifier is used to indicate the corresponding BS receiving resource, and wherein the identifier is a function of time and frequency of the corresponding BS receiving resource.

17. A method comprising:
broadcasting a set of uplink (UL) resources by a base station (BS) in a wireless network, wherein the UL resources are grouped into one or more subsets each corresponding to a BS transmitting spatial characteristics;
receiving one or more messages all serving as a first message by the BS from a user equipment (UE) based on a UE beam reciprocity state, which indicates whether the UE is reciprocal, partial reciprocal or non-reciprocal, wherein the first message is transmitted one or more times on one or more subsets of UL resources;
selecting one received first message from the one or more first messages by the BS; and
transmitting one or more first-message-response messages by the BS to the UE, wherein the transmitting of the first-message-response message is based on at least a BS transmitting spatial characteristics, which indicates whether the BS is reciprocal, partial reciprocal, partial reciprocal, or non-reciprocal, and wherein the BS is reciprocal if the BS is able to determine a BS RX beam for the UL reception based on UE's DL measurement on BS's one or more TX beams and BS is able to determine a BS TX beam for the DL transmission based on BS's UL measurement on BS's one or more RX beams, and wherein the BS is partial reciprocal if only the TX beam or the RX beam is reciprocal.

18. The method of claim 17, wherein the BS receives the one or more first messages by applying different spatial characteristic.

19. The method of claim 17, wherein the selecting one received first message is based on an estimation of experienced channels of corresponding first messages.

20. The method of claim 17, wherein the first-message-response message includes an identifier to indicate a corresponding BS receiving resource, and wherein the identifier is a function of time and frequency of the corresponding BS receiving resource.

21. The method of claim 17, wherein a plurality of first-message-response messages are transmitted if the BS is non-reciprocal or partial reciprocal.

22. The method of claim 21, wherein the number of first message-response messages are transmitted using a same BS spatial characteristics.

23. The method of claim 22, wherein the plurality of first message-response messages transmissions correspond to different random access response (RAR) windows understandable to UE.

24. The method of claim 17, wherein the plurality of first message-response messages are transmitted using different BS spatial characteristics.

25. The method of claim 24, wherein the plurality of first message-response messages transmissions correspond to a same RAR windows.

26. The method of claim 25, wherein the RAR window is further divided into sub-windows and there is one round of RAR transmission in individual sub-windows.

27. The method of claim 17, wherein the UL resources broadcasted on a BS transmitting characteristics is monitored in UL by a reciprocal BS receiving characteristics of the BS transmitting characteristics if the BS is reciprocal.

28. The method of claim 17, wherein the UL resources broadcasted on a BS transmitting characteristics is monitored in UL by a subset of BS receiving characteristics if BS is partially reciprocal.

29. The method of claim 17, wherein the UL resources broadcasted on a BS transmitting characteristics is an entire UL resources pool if the BS is non-reciprocal.

30. The method of claim 17, wherein the BS and all UEs are reciprocal, one UL resource is configured for each corresponding BS transmitting characteristics.

31. A user equipment (UE), comprising:
a transceiver that transmits and receives radio frequency (RF) signals from one or more base stations (BS);
a memory; and
a processor coupled to the memory, the processor configured to
select a subset of a configured uplink (UL) resources, wherein the UL resources is configured by a BS downlink (DL) broadcast message, and wherein the selecting a subset of the configured UL resources is based on a UE beam reciprocity, which indicates whether the UE is reciprocal, partial reciprocal, or non-reciprocal, and wherein the UE is reciprocal if the UE is able to determine a UE RX beam for the DL reception based on BS's UL measurement on UE's one or more TX beams, and the UE is able to determine a UE TX beam for the UL transmission based on UE's DL measurement on UE's one or more RX beams, and wherein the UE is partial reciprocal if only the TX beam or the RX beam is reciprocal,
transmit a first message to the BS, wherein the first message is transmitted one or more times on each of the selected set of UL resources,
receive one or more first-message-response messages from the BS in response to the first message from the BS, and
select one response message from the received one or more first-message-response messages, wherein the selected response message indicates a corresponding BS receiving (RX) resource, which is used by the UE for subsequent communication with the BS.

32. The UE of claim 31, wherein the selection of UL resources is at least based on the BS transmitting spatial characteristics, wherein a reciprocal BS has complete TX and RX beam reciprocity, a partial reciprocal BS has partial TX and RX beam reciprocity, and a non-reciprocal BS has no TX and RX beam reciprocity.

33. The UE of claim 32, wherein one or more first messages are transmitted on each of the entire configured UL resources corresponding to different BS receiving characteristics if the BS is non-reciprocal.

34. The UE of claim 32, wherein one or more first messages are transmitted on each of a subset of the entire configured UL resources if the BS is partial reciprocal.

35. The UE of claim 32, wherein one or more first messages are transmitted on one corresponding configured UL resource if the BS is reciprocal.

36. The UE of claim 32, wherein the transmitting of the first message is at least based on a UE transmitting spatial characteristics, which indicates whether the UE is reciprocal, partial reciprocal or non-reciprocal, wherein a reciprocal UE has complete TX and RX beam reciprocity, a partial reciprocal UE has partial TX and RX beam reciprocity, and a non-reciprocal BS has no TX and RX beam reciprocity.

37. The UE of claim 36, wherein a plurality of the first message is transmitted on each corresponding selected UL resources if the UE is non-reciprocal or partial reciprocal.

38. The UE of claim 37, wherein the UE applies different spatial characteristics to for the plurality of first message transmitted on each corresponding UL resources.

39. The UE of claim 31, wherein the UL resources are configured in multiple sets, and wherein each set of the UL resource corresponds to a BS TX characteristic.

* * * * *